United States Patent
Smith et al.

(10) Patent No.: US 10,179,870 B2
(45) Date of Patent: Jan. 15, 2019

(54) ABRASIVE COMPOSITION

(71) Applicant: 3M INNOVATIVE PROPERTIES COMPANY, St. Paul, MN (US)

(72) Inventors: Richard S. Smith, West St. Paul, MN (US); Douglas A. Davis, Cottage Grove, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 15/532,559

(22) PCT Filed: Nov. 24, 2015

(86) PCT No.: PCT/US2015/062261
§ 371 (c)(1),
(2) Date: Jun. 2, 2017

(87) PCT Pub. No.: WO2016/089660
PCT Pub. Date: Jun. 9, 2016

(65) Prior Publication Data
US 2017/0355880 A1      Dec. 14, 2017

Related U.S. Application Data

(60) Provisional application No. 62/087,884, filed on Dec. 5, 2014.

(51) Int. Cl.
*C09G 1/02* (2006.01)
*C09K 3/14* (2006.01)
*B29C 73/26* (2006.01)

(52) U.S. Cl.
CPC .............. *C09G 1/02* (2013.01); *C09K 3/1463* (2013.01); *B29C 2073/262* (2013.01)

(58) Field of Classification Search
CPC ...... C09K 3/1463; C09G 1/02; B24B 37/044; B29C 2073/262
See application file for complete search history.

(56) References Cited

U.S. PATENT DOCUMENTS

| | | |
|---|---|---|
| 5,266,088 A | 11/1993 | Sandusky |
| 2003/0228762 A1* | 12/2003 | Moeggenborg .......... C09G 1/02 438/691 |
| 2005/0130428 A1 | 6/2005 | Choi |
| 2005/0194565 A1* | 9/2005 | Kamiya ................... C09G 1/02 252/79.1 |
| 2005/0230354 A1* | 10/2005 | Hardikar ............... B24B 37/042 216/88 |
| 2012/0071378 A1* | 3/2012 | Gonzales ............... C11D 3/382 510/218 |
| 2013/0183826 A1 | 7/2013 | Tsuchiya |
| 2015/0376464 A1* | 12/2015 | Tsuchiya ............... B24B 37/044 252/79.1 |
| 2016/0215189 A1* | 7/2016 | Tsuchiya ................. B24B 37/00 |

FOREIGN PATENT DOCUMENTS

| | | | |
|---|---|---|---|
| WO | WO 2014/129408 | 8/2014 | |
| WO | 2014/075123 | * 4/2015 | ........... H01L 21/304 |

* cited by examiner

*Primary Examiner* — Pegah Parvini

(57) ABSTRACT

Provided herein are abrasive compositions that use surfactants containing block copolymers of both propylene oxide and ethylene oxide moieties. Abrasive compositions derived from these copolymers were capable of providing both superior levels of cut rate while preserving a high quality surface finish on gelcoat surfaces comparable to those achieved using conventional rubbing compounds.

15 Claims, No Drawings

ABRASIVE COMPOSITION

CROSS REFERENCE TO RELATED APPLICATIONS

This application is a national stage filing under 35 U.S.C. 371 of PCT/US2015/062261, filed 24 Nov. 2015, which claims the benefit of U.S. Provisional Patent Application No. 62/087,884 filed 5 Dec. 2014, the disclosures of which are incorporated by reference in their entirety herein.

FIELD OF THE INVENTION

Provided are abrasive compositions useful in abrading a substrate. More particularly, such compositions are suitable for abrading gelcoat substrates such as those found in marine applications.

BACKGROUND

Abrasives are commonly used in industrial and commercial applications to impart a desired surface finish or treatment to a substrate. The breadth of these applications explains the countless structural and chemical varieties of abrasive solutions presently available on the market.

One type of abrasive composition is based on a compound made from hard particles suspended in a soft medium such as a liquid, paste, or wax. These compositions can be disposed on a suitable backing, such as a cloth or buffing pad, and then rubbed onto the substrate to remove scratches. The rubbing process can be carried out by hand or assisted with a motorized tool. The liquid, paste, or wax acts as a binding agent that retains the particulate abrasives on the backing and enables the particles to move across and act to polish the substrate. In some applications, the binding agent can serve both a protective function that seals the surface against air and moisture and an aesthetic filler that makes scratches left behind less noticeable.

The marine industry is a specialized area that presents unique challenges to abrasive finishers because of the nature of the substrate. Marine vehicles are typically coated with a gelcoat, which is used to provide a high-quality finish on the exposed surfaces of a reinforced composite material. Gelcoats are often based on epoxy or unsaturated polyester resins specially formulated with thixotropic ingredients for increased viscosity and non-sag properties, and can be pigmented for color. These compositions are highly cross-linked and extremely tough. Over time, gelcoats can oxidize from ultraviolet light exposure, resulting in a chalky appearance. While this oxidation is a surface phenomenon, it can nonetheless be difficult to remove because of the intrinsic toughness of the gelcoat.

SUMMARY

Existing abrasive compounds specially formulated for gelcoats often contain relatively high amounts of nonionic surfactants. Compositions containing high levels of nonionic surfactants, particularly those including ethylene oxide, can yield enhanced cut levels compared with compositions containing lower amounts of surfactant. The problem with using high surfactant levels relates to the surface finish, which tends to degrade with increasing cut rate. This inverse relationship can also apply with respect to chemical modifications. For example, use of polypropylene oxide homopolymer was found to substantially increase cut levels but also produce an inferior surface finish.

The provided compositions solve this dilemma by using surfactants comprising block copolymers that contain both propylene oxide and ethylene oxide moieties, in combination with a co-surfactant that enables the composition to form a stable emulsion. Abrasive compositions that derive from these copolymers were capable of providing both high levels of cut rate and a high quality surface finish on gelcoats that is comparable to those of state of the art marine rubbing compounds.

In one aspect, an abrasive composition is provided. The abrasive composition comprises: an organic solvent; a nonionic surfactant comprising a block copolymer of polypropylene oxide and polyethylene oxide; a particulate abrasive; water; and a co-surfactant enabling the abrasive composition to form a stable oil-in-water emulsion in combination with the remaining components of the abrasive composition.

In another aspect, a method of abrading a substrate using a backing and the foregoing abrasive composition is provided, the method comprising: applying the aforementioned abrasive composition to either the backing or the substrate; placing the backing in frictional contact with the substrate, wherein the composition is at least partially absorbed into the backing and abrades an outermost surface of the substrate.

DETAILED DESCRIPTION

Described herein are abrasive compositions and methods of making and using the same that can be advantageously used in industrial and consumer finishing of
gelcoat surfaces. It should be understood that numerous other modifications and embodiments can be devised by those skilled in the art, which fall within the scope and spirit of the principles of the disclosure.

The provided abrasive compositions are heterogeneous, and include both solid and liquid components. These include an organic solvent, a nonionic surfactant comprising a block copolymer of polypropylene oxide and polyethylene oxide, a particulate abrasive, water, and a co-surfactant enabling the abrasive composition to form a stable oil-in-water emulsion in combination with the remaining components of the abrasive composition. Each of these, along with some additional optional components, is described in further detail in the following sections.

Organic Solvents

Organic solvents are well-known in the art and, in principle, can be generally included in the abrasive composition to provide workability. A given solvent may be volatile or non-volatile.

Particularly preferred organic solvents include aliphatic hydrocarbon solvents. Such solvents may be cycloaliphatic, alcohol ethers, alcohol ether acetates or mixtures thereof. Examples of such solvents include those hydrocarbon solvents available under the trade designations SHELLSOL H, SHELLSOL K, and SHELLSOL AB, all from Shell Chemicals, the Netherlands; the trade designations SOLVESSO 150, EXXSOL D30, EXXSOL D40, EXXSOL D60, and EXXSOL D80 solvents from ExxonMobil Chemical Company, Houston, Tex.; ester solvents such as ethyl diglycol, ethyl glycol acetate, butyl glycol, butyl glycol acetate, butyl diglycol, butyl diglycol acetate, and methoxypropylene glycol acetate; and ketone solvents like methyl ethyl ketone (MEK), acetone, methyl isobutyl ketone (MIBK) and methyl amyl ketone (MAK). Mixtures of the above solvents may also be used.

Total solvents are typically present in amounts of at least 1 percent, at least 2 percent, at least 5 percent, at least 10 percent, or at least 20 percent by weight based on the overall weight of the composition. In some embodiments, the total solvents are present in amounts of at most 70 percent, at most 65 percent, at most 60 percent, at most 55 percent, or at most 50 percent by weight based on the overall weight of the composition.

Nonionic Surfactants

Surfactants are amphipathic molecules composed of a hydrophilic part and a hydrophobic part that tend to segregate at the interface between fluid phases with different degrees of polarity and hydrogen bonds such as, for example, an oil/water interface or air/water interface. These characteristics make surfactants capable of reducing the surface tension and forming microemulsions, allowing substances that are generally insoluble in water, such as hydrocarbons, to be more easily dispersed in water. These characteristics give surfactants properties suitable for use as wetting agents, detergents, emulsifiers, foaming agents and dispersants.

Nonionic surfactants are a subset of surfactants based on long chain alcohols that display surfactant properties. Useful nonionic surfactants include ethylene oxide moieties, propylene oxide moieties, as well as mixtures thereof, and ethylene oxide-propylene oxide moieties present as a polymeric block. Additionally useful are nonionic surfactants which include an ethylene oxide compounds, propylene oxide compounds, as well as mixtures thereof, and ethylene oxide-propylene oxide compounds where the ethylene oxide or propylene oxide moiety is present as a polymeric block.

Also useful in the provided compositions are nonionic surfactants having any mixture or combination of ethylene oxide-propylene oxide moieties linked to an alkyl chain, where the ethylene oxide and propylene oxide moieties can be in either a randomized or ordered pattern and of any given length. Nonionic surfactants useful in the present invention can also include randomized polymeric blocks of ethylene oxide, propylene oxide, or ethylene oxide-propylene oxide, such as ethylene diamine ethylene oxides, ethylene diamine propylene oxides, mixtures thereof, and ethylene diamine ethylene oxide-propylene oxide compounds.

In a preferred embodiment, the nonionic surfactant is a block copolymer containing respective polymeric blocks of polypropylene oxide and polyethylene oxide. The block copolymer can have an overall polypropylene oxide:polyethylene oxide ratio of at least 60:40, at least 80:20, or at least 90:10 by weight. Optionally, the block copolymer has an overall polypropylene oxide:polyethylene oxide ratio of at most 99:1 by weight.

In some embodiments, the polypropylene oxide component of the block copolymer has a number average molecular weight of at least 400 g/mol, 500 g/mol, 700 g/mol, 800 g/mol, or 1,000 g/mol. In some embodiments, the polypropylene oxide component of the block copolymer has a number average molecular weight of at most 20,000 g/mol, at most 15,000 g/mol, at most 10,000 g/mol, at most 5,000 g/mol, or at most 2,000 g/mol.

The molecular architecture of the block copolymer need not be particularly restricted. Of the nonionic surfactants examined, however, block copolymers having ratios rich in propylene oxide yielded surprisingly high cut rates. Further, those block copolymers containing ethylene oxide endcaps also yielded surprisingly low haze and high gloss values. Particularly preferred nonionic surfactants have an ABA triblock copolymer architecture represented by polyethylene oxide-block-polypropylene oxide-block-polyethylene oxide, where the polypropylene oxide block represents at least 60 percent, at least 80 percent, or at least 90 percent by weight, based on the overall weight of the triblock copolymer. Optionally, nonionic surfactants based on the block copolymer include terminal hydroxyl groups.

In some embodiments, the nonionic surfactant has a hydrophilic-lipophilic balance preferably ranging from 1 to 12, and more preferably from 1 to 7. For the purposes of this disclosure, the hydrophilic-lipophilic balance is determined using Griffin's method along with generally accepted assumptions regarding identification of hydrophilic and lipophilic portions of a given surfactant molecule.

The presence of polypropylene oxide/polyethylene oxide block copolymers in the abrasive composition was found to have a significant effect on cut performance. In preferred abrasive compositions, the block copolymer was present in an amount of at least 0.1 percent, at least 0.3 percent, or at least 0.5 percent, relative to the overall weight of the abrasive composition. In these compositions, the block copolymer was present in an amount of at most 10 percent, at most 5 percent, or at most 2 percent, relative to the overall weight of the abrasive composition.

Co-Surfactants/Water

In exemplary compositions, the co-surfactant and water advantageously enable the abrasive composition to form a stable oil-in-water emulsion when used in combination with the remaining components of the abrasive composition. Certain co-surfactants were also found, surprisingly, to significantly improve haze and gloss, as measured after using the abrasive composition on gelcoat surfaces.

Examples of suitable co-surfactants include sodium dodecyl sulfate, dioctylsulfosuccinate, nonionic ethylene oxide/propylene oxide copolymers, PLURONIC F-68 (also known as PF-68 or POLOXAMER 188), cetyltrimethylammonium bromide (CTAB), PLURONIC F-127 (also known as PF-127 or POLOXAMER 407), TWEEN 80 (or T-80, a polyethylene sorbitol ester), sodium alginate, TWEEN 20, lecithin, sodium lauryl sulfate, monooleate, monolaurate, monostearate, stearyl alcohol, cetostearyl alcohol, tyloxapol, polyethoxylated castor oils such as CREMOPHOR and mixtures thereof (all available from Sigma-Aldrich, St. Louis, Mo.). The surfactants used in the nanosuspensions are preferably nonionic surfactants.

In some embodiments, the co-surfactant has a hydrophilic-lipophilic balance of at least 10, at least 11, or at least 12. On the upper end, the co-surfactant can have a hydrophilic-lipophilic balance of at most 18, at most 19, or at most 20.

A particularly preferred co-surfactant is polyethylene sorbitol ester, which is derived from polyethoxylated sorbitan and oleic acid. The hydrophilic groups in this compound are polyethers, also referred to as polyoxyethylene groups, and include polymers of ethylene oxide.

Preferably, the abrasive composition incorporates a sufficient amount of co-surfactant to preserve stability of the oil-in-water emulsion despite containing significant amounts of a non-ionic surfactant with a relatively lower hydrophilic-lipophilic balance. For example, in exemplary embodiments, the co-surfactant is present in an amount of at least 0.1 percent, at least 2 percent, or at least 3 percent by weight, relative to the overall weight of the composition. Conversely, the co-surfactant can be present in an amount of at most 25 percent, at most 15 percent, or at most 7 percent by weight relative to the overall weight of the composition.

The quantity of water, likewise, is an important parameter affecting emulsion stability. In some embodiments, water was present in an amount of at least 20 percent, at least 25 percent, at least 30 percent, at least 35 percent, or at least 40 percent, based on the overall weight of the composition. In some embodiments, water was present in an amount of at most 90 percent, at most 80 percent, at most 75 percent, at most 65 percent, or at most 60 percent, based on the overall weight of the composition.

Lubricants

Lubricants that may be used in the provided abrasive compositions include substantially silicone-free materials that aid the abrasive composition in its handling properties and help the buffing pad slide smoothly across the workpiece. Examples of suitable lubricants include oils (e.g., mineral, pine, and paraffinic oils), oleic acid, glycerol, polypropylene glycols, polybutylene glycols, and combinations thereof.

The lubricant can be present in amounts of at least 0.1 percent, at least 0.5 percent, at least 1 percent, at least 2 percent, or at least 3 percent by weight, based on the overall weight of the composition. On the upper end, the lubricant can be present in amounts of at most 15 percent, at most 12 percent, at most 10 percent, at most 8 percent, or at most 6 percent by weight, based on the overall weight of the composition.

Thickeners

As an optional component, thickeners, also referred to as thickening agents, can be incorporated into the abrasive composition to increase its viscosity or otherwise alter its rheological characteristics. Examples of suitable thickeners include carboxyvinyl resins (e.g., CARBOPOL, commercially available from Noveon Inc., Cleveland, Ohio), acrylics (e.g., ACUSOL, commercially available from Dow Chemical Company, Midland, Mich., USA), clay (e.g., BENTONE, commercially available from Elementis Specialties Rheox, Highstown, N.J.), and combinations thereof.

A stand-alone thickener can be added in effective amounts ranging from 0.2 percent to 5 percent by weight, or more particularly, ranging from 0.5 percent to 3 percent by weight, based on the overall weight of the composition.

Certain thickeners, such as ACUSOL acrylics, are known as associative thickeners. These thickeners operate by chemically interacting with an associated base chemical. Suitable base chemicals include monoethanolamine, diethanolamine, triethanolamine, morpholine, and combinations thereof. Base chemicals may be incorporated into the abrasive composition in effective amounts ranging from 0.05 percent by weight to 3 percent by weight, and more particularly ranging from 0.1 percent by weight to 1 percent by weight, based on the overall weight of the composition.

Particulate Abrasives

Particulate abrasives to be used in the present invention are generally comprised of hard minerals that act to remove material from the substrate to be abraded. The grain size of such particles generally varies according to the application and the stage of polishing. In preferred embodiments, the particulate abrasives have an average particle diameter ranging from 0.5 micrometers to 50 micrometers. In particular, the average particle diameter preferably ranges from 4 micrometers to 50 micrometers in a rough abrading step and then ranges from 0.5 to 4 micrometers in a finishing abrading step.

In some embodiments, the hardness of an abrasive material used for the particulate abrasives ranges from 4 to 10 on the Mohs hardness scale. Examples of the abrasives include well known natural abrasives and artificial abrasives. Suitable abrasives include (sintered) diatomaceous earth, tripoli, (sintered) kaolin, silica powder, and the like; artificial abrasives that are suitably used include alumina abrasives (e.g., sintered alumina abrasive, brown alumina abrasive, white alumina abrasive, pink alumina abrasive, mono-crystalline fused alumina abrasive), colloidal silica, synthetic silica, calcium carbonate, stannic oxide, silicon carbide, and mixtures thereof.

Other Additives

The formulations disclosed herein may further include various other functional and/or aesthetic additives.

As an example, the provided abrasive composition may optionally include a preservative or anti-microbial chemical compound. Examples of suitable preservatives include aqueous, non-metallic preservatives (e.g., NUOSEPT, commercially available from International Specialty Products, Wayne, N.J.), microbicide preservatives (e.g., NUOCIDE, commercially available from International Specialty Products, Wayne, N.J.), personal-care product preservatives (e.g., KATHON, commercially available from Dow Chemical Company, Midland, Mich., USA), and combinations thereof. The preservatives may be present in the abrasive composition in effective amounts of 0.05 percent to 0.5 percent by weight, and more particularly in effective amounts of 0.1 percent to 0.3 percent by weight, based on the overall weight of the composition.

In some embodiments, the composition includes any of a variety of dyes or pigments for imparting a desirable color to the abrasive composition. As a further option, one or more additives may be included to provide a desirable fragrance to the composition if so desired.

Methods of Making

In an exemplary embodiment, the abrasive composition of the present invention is prepared by mixing the organic solvent, co-surfactant, and lubricant in a batch mixer at room temperature. The water, particulate abrasives, nonionic surfactant, and any other optional additives, can be then be added at low shear to produce a stable oil-in-water emulsion. Optionally, the shear rate can then be increased as the thickener is added in appropriate amounts to provide the desired viscosity of the finished abrasive composition. Once all of the desired components are incorporated, the abrasive composition may be continuously mixed at high shear for several minutes at room temperature. While any of a number of high-shear mixers may be used to prepare these disclosed abrasive compositions, particularly suitable high-shear mixers include, for example, the Premier model mixer, commercially available from the Dispersator Company, Temple, Pa.

Methods of Use

A typical finishing process for a gelcoat surface includes three basic steps. The first is a cleaning step that removes salt, dirt, grease, mold, and stains from the substrate surface to the finished. The second is a compounding and polishing step, which creates the smooth glossy surface to be protected. Depending on the condition of the surface, there could be several stages to this process. The third step is a waxing step. This step involves applying a thin polymer or wax coating onto the surface to seal and protect the polished gelcoat.

The provided abrasive compositions are especially useful in the aforementioned polishing step for removing defects on these surfaces. In some embodiments, the gelcoat is initially abraded using a coarse abrasive to remove the majority of the defects. When used, coarse abrasives have the tendency to leave scratch marks on the gelcoat surface. Advantageously, the provided abrasive composition can then be applied and rubbed on the gelcoat surface with a buffing pad to remove the scratch marks.

After the initial application and buffing cycle is completed, the volatile components evaporate from the remaining abrasive composition. Additional cycles of distributing the abrasive composition on the surface with buffing pads may then be carried out. Preferably, this occurs using a series of abrasive buffing pads with decreasing abrasiveness to provide a progressively finer cut on the gelcoat surface. It is not uncommon for several cycles, with a total working time of several minutes each, to be used to remove the scratch marks and provide a smooth surface upon completion. Additional application and buffing cycles may be used as appropriate for the particular application at hand.

The buffing pads used with the provided abrasive composition to polish the gelcoat surfaces may be applied by hand or using a power tool, such as dual action or orbital sander.

While not intended to be exhaustive, further illustrative embodiments are enumerated below:

1. An abrasive composition comprising: an organic solvent; a nonionic surfactant comprising a block copolymer of polypropylene oxide and polyethylene oxide; a particulate abrasive; water; and a co-surfactant enabling the abrasive composition to form a stable oil-in-water emulsion in combination with the remaining components of the abrasive composition.
2. The composition of embodiment 1, wherein the nonionic surfactant has a hydrophilic-lipophilic balance ranging from 1 to 12.
3. The composition of embodiment 2, wherein the nonionic surfactant has a hydrophilic-lipophilic balance ranging from 1 to 7.
4. The composition of any one of embodiments 1-3, wherein the co-surfactant is nonionic and has a hydrophilic-lipophilic balance ranging from 10 to 20.
5. The composition of any one of embodiments 1-4, wherein the organic solvent is an aliphatic hydrocarbon solvent present in an amount ranging from 1 to 70 weight percent, based on the overall weight of the composition.
6. The composition of any one of embodiments 1-5, wherein the block copolymer has a polypropylene oxide: polyethylene oxide ratio ranging from 60:40 to 99:1 by weight.
7. The composition of embodiment 6, wherein the block copolymer has a polypropylene oxide: polyethylene oxide ratio ranging from 80:20 to 99:1 by weight.
8. The composition of embodiment 7, wherein the block copolymer has a polypropylene oxide: polyethylene oxide ratio ranging from 90:10 to 99:1 by weight.
9. The composition of any one of embodiments 1-8, wherein the block copolymer is an ABA triblock copolymer represented by polyethylene oxide-block-polypropylene oxide-block-polyethylene oxide.
10. The composition of any one of embodiments 1-9, wherein the block copolymer comprises terminal hydroxyl groups.
11. The composition of any one of embodiments 1-10, wherein the polypropylene oxide component of the block copolymer has a number average molecular weight ranging from 400 g/mol to 20,000 g/mol.
12. The composition of embodiment 11, wherein the polypropylene oxide component of the block copolymer has a number average molecular weight ranging from 700 g/mol to 10,000 g/mol.
13. The composition of embodiment 12, wherein the polypropylene oxide component of the block copolymer has a number average molecular weight ranging from 1,000 g/mol to 2,000 g/mol.
14. The composition of any one of embodiments 1-13, wherein the block copolymer is present in an amount ranging from 0.1 percent to 10 percent by weight relative to the overall weight of the composition.
15. The composition of embodiment 14, wherein the block copolymer is present in an amount ranging from 0.3 percent to 5 percent by weight relative to the overall weight of the composition.
16. The composition of embodiment 15, wherein the block copolymer is present in an amount ranging from 0.5 percent to 2 percent by weight relative to the overall weight of the composition.
17. The composition of any one of embodiments 1-16, further comprising a lubricant.
18. The composition of embodiment 17, wherein the lubricant is selected from the group consisting of mineral oil, glycerine, and fatty acids.
19. The composition of embodiment 17 or 18, wherein the lubricant is present in an amount ranging from 0.1 percent to 15 percent by weight relative to the overall weight of the composition.
20. The composition of embodiment 19, wherein the lubricant is present in an amount ranging from 2 percent to 10 percent by weight relative to the overall weight of the composition.
21. The composition of embodiment 20, wherein the lubricant is present in an amount ranging from 3 percent to 6 percent by weight relative to the overall weight of the composition.
22. The composition of any one of embodiments 1-21, further comprising a thickener.
23. The composition of embodiment 22, wherein the thickener comprises an anionic acrylic polymer having hydrophobic chains.
24. The composition of embodiment 22 or 23, wherein the thickener interacts with a base chemical in the composition, the base chemical comprising triethanolamine.
25. The composition of any one of embodiments 1-24, wherein the co-surfactant comprises a polyethylene sorbitol ester.
26. The composition of any one of embodiments 1-25, wherein the co-surfactant is present in an amount ranging from 0.1 percent to 25 percent by weight relative to the overall weight of the composition.
27. The composition of embodiment 26, wherein the co-surfactant is present in an amount ranging from 2 percent to 15 percent by weight relative to the overall weight of the composition.
28. The composition of embodiment 27, wherein the co-surfactant is present in an amount ranging from 3 percent to 7 percent by weight relative to the overall weight of the composition.
29. The composition of any one of embodiments 1-28, wherein the particulate abrasive comprises aluminum oxide.
30. The composition of any one of embodiments 1-29, wherein the particulate abrasive has a median particle diameter ranging from 0.5 micrometers to 50 micrometers.
31. The composition of embodiment 30, wherein the particulate abrasive has a median particle diameter ranging from 4 micrometers to 50 micrometers.
32. The composition of embodiment 30, wherein the particulate abrasive has a median particle diameter ranging from 0.5 micrometers to 4 micrometers.
33. The composition of any one of embodiments 1-32, further comprising an antimicrobial agent.
34. The composition of any one of embodiments 1-33, wherein the water is present in an amount ranging from 20 percent to 90 percent by weight relative to the overall weight of the composition.

35. The composition of embodiment 34, wherein the water is present in an amount ranging from 30 percent to 75 percent by weight relative to the overall weight of the composition.
36. The composition of embodiment 35, wherein the water is present in an amount ranging from 40 percent to 60 percent by weight relative to the overall weight of the composition.
37. A method of abrading a substrate using a backing and the abrasive composition of any one of embodiments 1-36, the method comprising: applying the composition to either the backing or the substrate; placing the backing in frictional contact with the substrate, wherein the composition is at least partially absorbed into the backing and abrades an outermost surface of the substrate.

EXAMPLES

Objects and advantages of this disclosure are further illustrated by the following non-limiting examples, but the particular materials and amounts thereof recited in these examples, as well as other conditions and details, should not be construed to unduly limit this disclosure.

The following abbreviations are used in this disclosure:
° C.: degrees centigrade
g/mol: grams per mole
min: minute
mm: millimeter Unless otherwise noted, all parts, percentages, ratios, etc. in the examples and the rest of the specification are by weight, and all reagents used in the examples were obtained, or are available, from general chemical suppliers such as, for example, Sigma-Aldrich Company, Saint Louis, Mo., USA, or may be synthesized by conventional methods.

Abrasive-1: An α-aluminum oxide powder with average particle size 4-6 micrometers, obtained from Ferro Corporation, Mayfield Heights, Ohio, USA.

Abrasive-2: An α-aluminum oxide powder with average particle size 6-8 micrometers, from PIDC Company, Ann Arbor, Mich., USA.

Acusol 820: A hydrophobically modified alkali soluble acrylic polymer emulsion, obtained under the trade designation "ACUSOL 820" from Dow Chemical Company, Midland, Mich., USA.

Brij 23: A non-ionic polyoxyethylene ether with tricosaethylene glycol dodecyl ether as main component, obtained under the trade designation "BRIJ L23" from Sigma-Aldrich Company.

Exxsol D80: A dearomatized hydrocarbon fluid, obtained under the trade designation "EXXSOL D80" from ExxonMobil Chemical Company, Houston, Tex., USA.

Kathon CG: A broad-spectrum biocide aqueous solution with 5-chloro-2-methyl-4-isothiazolin-3-one and 2-methyl-4-isothiazolin-3-one as active ingredients, obtained under the trade designation "KATHON CG" from Dow Chemical Company.

NIS 1: A block copolymer of approximately 2000 molecular weight with a polypropylene oxide core which represents 90% of the total molecular weight capped by ethylene oxide, obtained under the trade designation "PLURONIC L61" from BASF Company, Ludwigshafen, Germany or obtained under the trade designation "SYNPERONIC PE/L 61" from Croda International plc, Snaith, UK.

NIS2: A block copolymer of approximately 12,000 molecular weight with a polypropylene oxide core which represents 30% of the total molecular weight capped by ethylene oxide obtained under the trade designation "SYNPERONIC PE/F 127" from Croda International plc.

NIS3: A block copolymer of approximately 1,100 molecular weight with a polypropylene oxide core which represents 90% of the total molecular weight capped by ethylene oxide, obtained under the trade designation "SYNPERONIC PE/L 31" from Croda International plc.

NIS4: A block copolymer of approximately 2,900 molecular weight with a polypropylene oxide core which represents 60% of the total molecular weight capped by ethylene oxide obtained under the trade designation "PLURONIC L64" from BASF Company, Ludwigshafen, Germany.

NIS5: A block copolymer of approximately 1,850 molecular weight with a polypropylene oxide core which represents 70% of the total molecular weight capped by ethylene oxide, obtained under the trade designation "PLURONIC L43" from BASF Company.

NIS6: A tetrafunctional block copolymer of approximately 6,900 molecular weight consisting of an ethylene diamine core functionalized with polypropylene oxide which represents 90% of the total molecular weight capped by ethylene oxide, obtained under the trade designation "SYNPERONIC T/1301" from Croda International plc.

NIS7: A block copolymer of approximately 2,500 molecular weight with a polypropylene oxide core which represents 80% of the total molecular weight capped by ethylene oxide, obtained under the trade designation "PLURONIC L62" from BASF Company.

NIS8: A block copolymer of approximately 3,300 molecular weight with a polyethylene oxide core capped by polypropylene oxide which represents 90% of the total molecular weight, obtained under the trade designation "PLURONIC 31R1" from BASF Company.

NIS9: A block copolymer of approximately 3,800 molecular weight with a polypropylene oxide core which represents 90% of the total molecular weight capped by ethylene oxide, obtained under the trade designation "PLURONIC L101" from BASF Company, or obtained under the trade designation "SYNPERONIC PE/L 101" from Croda International plc.

NIS10: A block copolymer of approximately 2,700 molecular weight with a polyethylene oxide core capped by polypropylene oxide which represents 60% of the total molecular weight, obtained under the trade designation "PLURONIC 17R4" from BASF Company.

NIS11: A polypropylene glycol homopolymer of approximately 400 molecular weight obtained under the trade designation "PPG 400" from Sigma-Aldrich Company.

NIS12: A tetrafunctional block copolymer of approximately 3,600 molecular weight consisting of an ethylene diamine core functionalized with polypropylene oxide which represents 90% of the total molecular weight capped by ethylene oxide obtained under the trade designation "SYNPERONIC T/701" from Croda International plc.

NIS13: A block copolymer of approximately 2,200 molecular weight with a polyethylene oxide core capped by polypropylene oxide which represents 80% of the total molecular weight, obtained under the trade designation "PLURONIC 17R2" from BASF Company.

NIS14: A block copolymer of approximately 3,600 molecular weight with a polyethylene oxide core capped by polypropylene oxide which represents 60% of the total molecular weight, obtained under the trade designation "PLURONIC 25R4" from BASF Company.

Parol 70: A technical grade white mineral oil, obtained under the trade designation "PAROL 70" from Calumet Specialty Product Partners, LP, Indianapolis, Ind., USA.

Tergitol 15-S-7: A secondary alcohol ethoxylate, nonionic surfactant, obtained under the trade designation "TERGITOL 15-S-7" from Dow Chemical Company.

Tomadol 1-5: A non-ionic surfactant made from linear C11 alcohol with 5 moles (average) of ethylene oxide, obtained under the trade designation "TOMADOL 1-5" from Air Products and Chemicals, Inc., Allentown, Pa., USA.

Tween 80: Polysorbate 80, a nonionic surfactant and emulsifier, obtained under the trade designation "TWEEN 80" from Sigma-Aldrich Company.

Example 1

A 400 gram batch of a buffing compound was made as follows. 64 grams Exxsol D80, 20 grams Tween 80, and 12 grams Parol 70 were added into a mixer (Dispermat CV2-FHV, obtained from VMA-Getzmann, Reichshof, Germany) and mixed for 15 minutes at approximately 23° C. Then, 2 grams triethanolamine, 222.6 grams water, and 8 grams glycerine were added into the mixer and mixed for 10-15 minutes at low shear. 60 grams Abrasive-1, 4 grams NIS1, and 0.4 grams Kathon CG were then added and mixing continued until a homogeneous dispersion was formed (approximately 15 minutes). 7 grams Acusol 820 was slowly added to the dispersion while the shear rate was increased. Mixing was continued at high shear for another 30 minutes.

Example 2

The procedure generally described in Example 1 was repeated, wherein the 60 grams Abrasive-1 was replaced with 60 grams Abrasive-2.

Example 3

The procedure generally described in Example 1 was repeated, wherein the 20 grams Tween 80 was replaced with 20 grams Brij 23.

Example 4

The procedure generally described in Example 1 was repeated, wherein the 20 grams Tween 80 was replaced with 20 grams Tergitol 15-S-7.

Example 5

The procedure generally described in Example 1 was repeated, wherein the 20 grams Tween 80 was replaced with 20 grams Tomadol 1-5.

Example 6

The procedure generally described in Example 1 was repeated, wherein 2 grams of NIS1 and 224.6 grams of water were used.

Example 7

The procedure generally described in Example 1 was repeated, wherein 20 grams of NIS1 and 206.6 grams of water were used.

Example 8

The procedure generally described in Example 1 was repeated, wherein 4 grams NIS1 was replaced by 4 grams NIS2.

Example 9

The procedure generally described in Example 1 was repeated, wherein 4 grams NIS1 was replaced by 4 grams NIS3.

Example 10

The procedure generally described in Example 1 was repeated, wherein 4 grams NIS1 was replaced by 4 grams NIS4.

Example 11

The procedure generally described in Example 1 was repeated, wherein 4 grams NIS1 was replaced by 4 grams NIS5.

Example 12

The procedure generally described in Example 1 was repeated, wherein 4 grams NIS1 was replaced by 4 grams NIS6.

Example 13

The procedure generally described in Example 1 was repeated, wherein 4 grams NIS1 was replaced by 4 grams NIS7.

Example 14

The procedure generally described in Example 1 was repeated, wherein 4 grams NIS1 was replaced by 4 grams NIS8.

Example 15

The procedure generally described in Example 1 was repeated, wherein 4 grams NIS1 was replaced by 4 grams NIS9.

Example 16

The procedure generally described in Example 1 was repeated, wherein 4 grams NIS 1 was replaced by 4 grams NIS10.

Example 17

The procedure generally described in Example 1 was repeated, wherein 4 grams NIS1 was replaced by 4 grams NIS11.

Example 18

The procedure generally described in Example 1 was repeated, wherein 4 grams NIS 1 was replaced by 4 grams NIS12.

Example 19

The procedure generally described in Example 1 was repeated, wherein 4 grams NIS 1 was replaced by 4 grams NIS13.

Example 20

The procedure generally described in Example 1 was repeated, wherein 4 grams NIS 1 was replaced by 4 grams NIS14.

Comparative

The procedure generally described in Example 1 was repeated, wherein no NIS 1 and 226.6 grams of water was used.

Test Panels

Gelcoat panels, whose general construction mirrors what is found in certain segments of marine construction, can be described as follows. First, a layer of black or white gelcoat supplied by Ashland Inc., Covington, Ky., USA or HK Research Corporation, Hickory, N.C., USA, was laid down on a flat mold at an average thickness of 0.5 mm. Layers of fiberglass were applied over the gelcoat to a thickness of approximately 3 mm. A foam core, 9-12 mm in thickness, was applied to the fiberglass. A second layer of fiberglass, approximately 3 mm in thickness, followed by a gelcoat with a thickness of approximately 0.5 mm, was applied to this foam core. The construction was cured to the manufacturer's specifications to give a double-sided gelcoat panel of 16-19 mm in thickness. Panels for testing, 3 feet (0.91 meters) by 4 feet (1.22 meters), were cut from this larger master panel.

Evaluations

Unless otherwise stated, all tools and materials identified by their trade designations in the following evaluations were obtained from 3M Company, St. Paul, Minn.

A 3 feet (0.91 meters) by 4 feet (1.22 meters) gelcoat panel was sanded with a 6 inch (15.24 centimeter) diameter P800 Finishing Film, obtained under trade designation "PURPLE FINISHING FILM HOOKIT DISC P800," using a dual action sander. The panel, oriented with the long axis horizontal, was sanded with one disc in overlapping, horizontal passes from top to bottom and bottom to top. The procedure was repeated using a second disc and again using a third disc. The panel was divided vertically into thirds. To account for panel to panel variations in surface finish, one third of the each panel was buffed using either Example 1 or Comparative and a wool polishing pad (PN 5754) to serve as a control. The remaining two sections were buffed with one or two different Example compounds. Each area was buffed by using 9 grams of buffing compound for the first minute. For each subsequent minute of buffing, 6 grams of compound were added. Buffing continued until sand scratches were removed. The total time of buffing was recorded.

The test panels after completion of buffing were evaluated as follows:

Cut Time: Time required to visually remove all sand scratches by buffing with an abrasive composition.

Relative Cut: Cut Time for Comparative divided by the Cut Time for a given Example.

Gloss/Haze: 20 degree gloss and haze as measured by a BYK micro haze plus Cat. No. 4632. Values shown represent the average of four readings taken over the area buffed.

Results, shown in Table 1, show the compatibility of the cut enhancing non-ionic surfactant with a variety of minerals and co-surfactants. No significant change in cut, gloss, or haze is seen between Example 1 and Examples 2-5.

TABLE 1

|  | Cut Time (min) | Gloss | Haze |
|---|---|---|---|
| Test 1 | | | |
| Example 1 | 2 | 85.5 | 49.6 |
| Example 2 | 2 | 86.8 | 46.1 |
| Test 2 | | | |
| Example 1 | 3 | 83.7 | 42.0 |
| Example 3 | 3 | 85.5 | 42.6 |
| Example 4 | 3 | 78.9 | 43.0 |
| Test 3 | | | |
| Example 1 | 3 | 84.6 | 44.3 |
| Example 5 | 3 | 79.8 | 47.1 |

Results in Table 2 show the effects of different non-ionic surfactant levels (Test 4) and compositions (Tests 5-11) on cut and gloss.

TABLE 2

|  | Cut Time (min) | Relative Cut | Gloss |
|---|---|---|---|
| Test 4 | | | |
| Comparative | 6 |  | 84.0 |
| Example 6 | 4 | 1.5 | 81.9 |
| Example 7 | 3 | 2 | 80.5 |
| Test 5 | | | |
| Comparative | 6 |  | 81.5 |
| Example 1 | 3 | 2 | 79.2 |
| Example 8 | 6 | 1 | 77.2 |
| Test 6 | | | |
| Comparative | 6 |  | 81.4 |
| Example 9 | 4 | 1.5 | 78.1 |
| Example 10 | 6 | 1 | 80.5 |
| Test 7 | | | |
| Comparative | 5 |  | 83.1 |
| Example 11 | 5 | 1 | 81.4 |
| Example 12 | 4 | 1.25 | 79.4 |
| Test 8 | | | |
| Comparative | 6 |  | 82.1 |
| Example 13 | 5 | 1.2 | 81.7 |
| Example 14 | 5 | 1.2 | 79.8 |
| Test 9 | | | |
| Comparative | 6 |  | 80.4 |
| Example 15 | 4 | 1.5 | 79.0 |
| Example 16 | 5 | 1.2 | 78.1 |
| Test 10 | | | |
| Comparative | 6 |  | 79.4 |
| Example 17 | 4 | 1.5 | 75.6 |
| Example 18 | 5 | 1.2 | 78.0 |
| Test 11 | | | |
| Comparative | 5 |  | 82.7 |
| Example 19 | 5 | 1 | 81.7 |
| Example 20 | 5 | 1 | 82.2 |

All cited references, patents, and patent applications in the above application for letters patent are herein incorporated by reference in their entirety in a consistent manner. In the event of inconsistencies or contradictions between portions of the incorporated references and this application, the information in the preceding description shall control. The preceding description, given in order to enable one of ordinary skill in the art to practice the claimed disclosure, is not to be construed as limiting the scope of the disclosure, which is defined by the claims and all equivalents thereto.

What is claimed is:

1. An abrasive composition comprising:
    an organic solvent;
    a nonionic surfactant comprising a block copolymer of polypropylene oxide and polyethylene oxide, wherein the block copolymer is an ABA triblock copolymer represented by polyethylene oxide-block-polypropylene oxide-block-polyethylene oxide and the polypropylene oxide block represents at least 60% based on the overall weight of the triblock copolymer;
    a particulate abrasive;
    water; and
    a co-surfactant enabling the abrasive composition to form a stable oil-in-water emulsion in combination with the remaining components of the abrasive composition.

2. The composition of claim 1, wherein the nonionic surfactant has a hydrophilic-lipophilic balance ranging from 1 to 12.

3. The composition of claim 1, wherein the co-surfactant is nonionic and has a hydrophilic-lipophilic balance ranging from 10 to 20.

4. The composition of claim 1, wherein the block copolymer has a polypropylene oxide: polyethylene oxide ratio ranging from 60:40 to 99:1 by weight.

5. The composition of claim 4, wherein the block copolymer has a polypropylene oxide: polyethylene oxide ratio ranging from 90:10 to 99:1 by weight.

6. The composition of claim 1, wherein the block copolymer comprises terminal hydroxyl groups.

7. The composition of claim 1, wherein the block copolymer is present in an amount ranging from 0.1 percent to 10 percent by weight relative to the overall weight of the composition.

8. The composition of claim 7, wherein the block copolymer is present in an amount ranging from 0.5 percent to 2 percent by weight relative to the overall weight of the composition.

9. The composition of claim 1, further comprising a lubricant selected from the group consisting of mineral oil, glycerine, and fatty acids.

10. The composition of claim 1, further comprising a thickener, wherein the thickener comprises an anionic acrylic polymer having hydrophobic chains.

11. The composition of claim 1, wherein the co-surfactant comprises a polyethylene sorbitol ester.

12. The composition of claim 1, wherein the co-surfactant is present in an amount ranging from 0.1 percent to 25 percent by weight relative to the overall weight of the composition.

13. The composition of claim 12, wherein the co-surfactant is present in an amount ranging from 3 percent to 7 percent by weight relative to the overall weight of the composition.

14. A method of abrading a substrate using a backing and the abrasive composition of claim 1, the method comprising:
    applying the composition to either the backing or the substrate;
    placing the backing in frictional contact with the substrate, wherein the composition is at least partially absorbed into the backing and abrades an outermost surface of the substrate.

15. The method of claim 14 wherein the substrate is a gelcoat substrate.

* * * * *